United States Patent [19]

Berry

[11] 3,841,825

[45] Oct. 15, 1974

[54] ELECTRICAL CONTROL SYSTEM

[76] Inventor: James S. Berry, P.O. 703 Patterson Rd., Savannah, Tenn. 38372

[22] Filed: July 18, 1973

[21] Appl. No.: 380,231

[52] U.S. Cl............................ 431/66, 317/98, 431/72
[51] Int. Cl............................................. F23n 5/20
[58] Field of Search ......... 431/66, 67, 72, 258, 254; 317/98

[56] References Cited
UNITED STATES PATENTS

| | | | |
|---|---|---|---|
| 3,437,880 | 4/1969 | Profunser.............................. | 317/98 |
| 3,676,042 | 7/1972 | Osborne............................... | 431/66 |

Primary Examiner—Edward G. Favors
Attorney, Agent, or Firm—Griffin, Branigan and Butler

[57] ABSTRACT

A gas fired heater is provided with a catalytic ignitor for igniting fuel fed to the heater through a main burner control valve. A thermostat switch starts a fan motor and the fan motor closes a switch to apply power to an electronic ignition circuit. The circuit includes a first monostable multivibrator responsive to application of power to the circuit for energizing the catalytic ignitor, and a second monostable multivibrator responsive to current flow through the ignitor for activating the main burner control valve. The control system requires no power when the thermostat switch is open and requires only minimal power when the thermostat switch is closed. The system may be operated in an environment where the power supply for the system provides a voltage which varies over a wide range.

16 Claims, 3 Drawing Figures

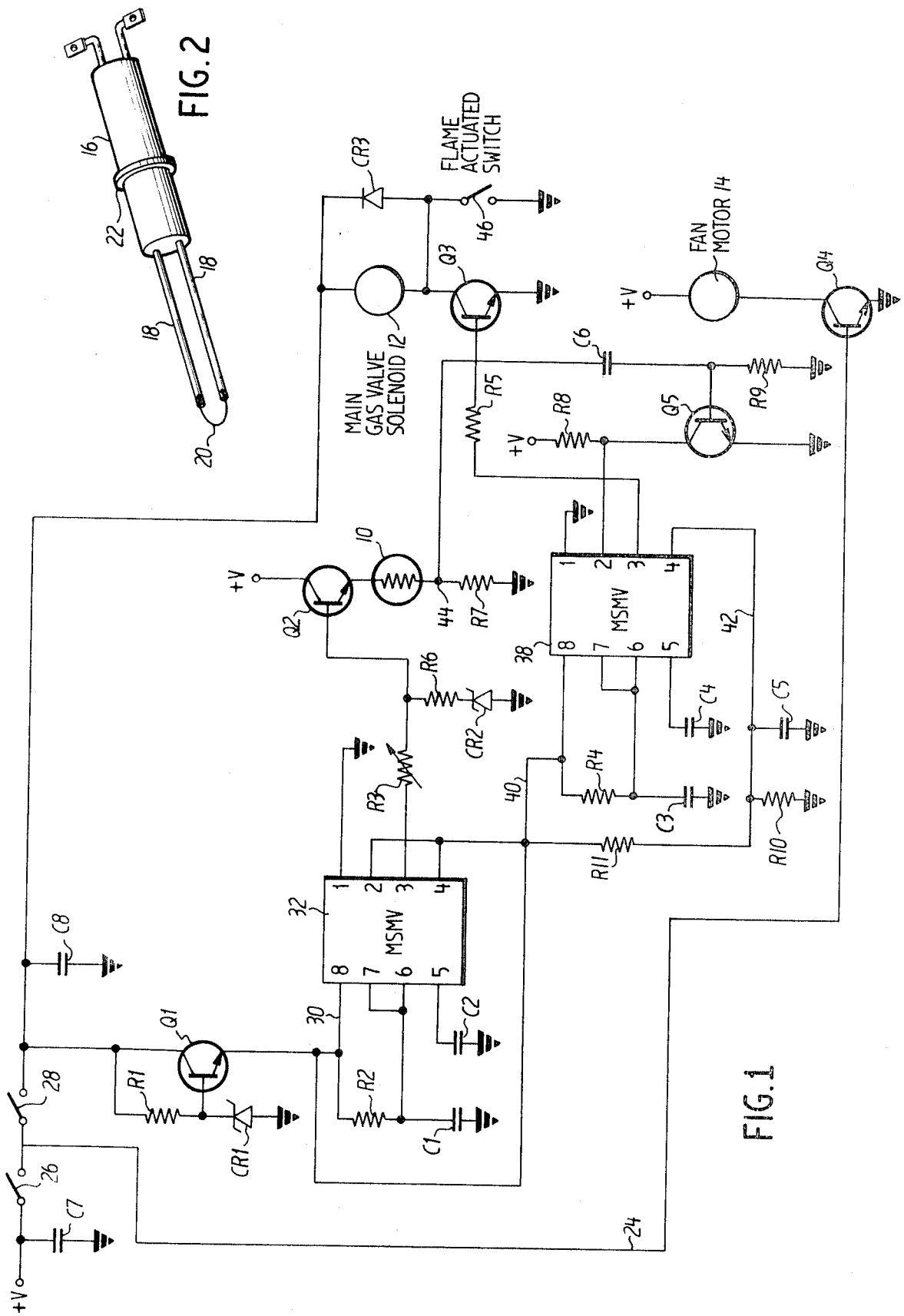

3,841,825

ELECTRICAL CONTROL SYSTEM

BACKGROUND OF THE INVENTION

The present invention relates to controls for heating systems in general and is particularly adapted for advantageous use in controlling space heaters of the type frequently found in camper trailers.

Heating control systems of the type used in camper trailers must be capable of safe and efficient performance even though the power supply voltage may vary within wide limits. For example, when a camper trailer is attached to battery chargers located in trailer parks, the voltage of the charger may vary several volts within a range extending up to about 21 volts. On the other hand, when the system is operated from an automobile battery, the battery power may be low and battery may deliver a voltage as low as 8 or 9 volts. Since these systems usually employ a bottled gas such as propane as a heating fuel, it is essential for safety and convenience that the heating control system function properly at all times, regardless of variations in the power supply voltage.

In recent years, much emphasis has been placed on the problems of conservation of energy and air pollution. Gas fired heaters of the prior art have conventionally employed a continuously burning pilot flame for igniting the main burner of the heater. The pilot flame continuously consumes fuel and represents a constant source of air pollution. The consumption of fuel by the pilot flame is of particular concern in space heaters used in camper trailers because the fuel supply is usually bottled and must be replaced periodically.

A further problem associated with heating systems of the type used in camper trailers is that of power consumption. The control system continuously draws power from the vehicle battery.

SUMMARY OF THE INVENTION

An object of the present invention is to provide an electronic control system for controlling a gas fired heater, said control system being capable of operating from power sources supplying wide ranges of voltages.

An object of the present invention is to provide a novel electronic control system for controlling gas fired heaters, said control system requiring no pilot flame.

A further object of this invention is to provide a novel electronic control system for a gas fired heater, said control system requiring no power until heating is required, and requiring a minimal amount of current once the main burner has been ignited. A feature of the invention is the provision of a current carrying catalytic ignitor for igiting gas issuing from a main gas burner, and control means responsive to current flow through the ignitor for opening the main burner control valve, whereby no gas may issue from the main burner until after a heating current has begun flowing through the ignitor.

A further feature of the invention is the provision of two monostable multivibrator circuits, one responsive to application of power to the system for energizing an ignitor for a predetermined interval, and one responsive to current flow through the ignitor for energizing a main burner control valve for a predetermined interval.

The above stated and other objects of the invention are obtained by the provision of an electronic control system for controlling a fan motor, a catalytic ignitor, and a main gas burner control valve, the control system including thermostat switch means for applyng power to the system and energizing the fan motor, a first monostable multivibrator responsive to application of power to the system for energizing the ignitor for a predetermined interval, and a second monostable multivibrator responsive to current flow through the ignitor for energizing the main gas burner control valve.

Other objects of the invention and its mode of operation will become apparent consideration of the following description and the accompanying drawings.

BRIEF DESCRIPTION OF DRAWING

FIG. 1 is a schematic wire diagram of the control system;

FIG. 2 is a perspective view of a catalytic ignitor; and,

DESCRIPTION OF A PREFERRED EMBODIMENT

Figure 3:
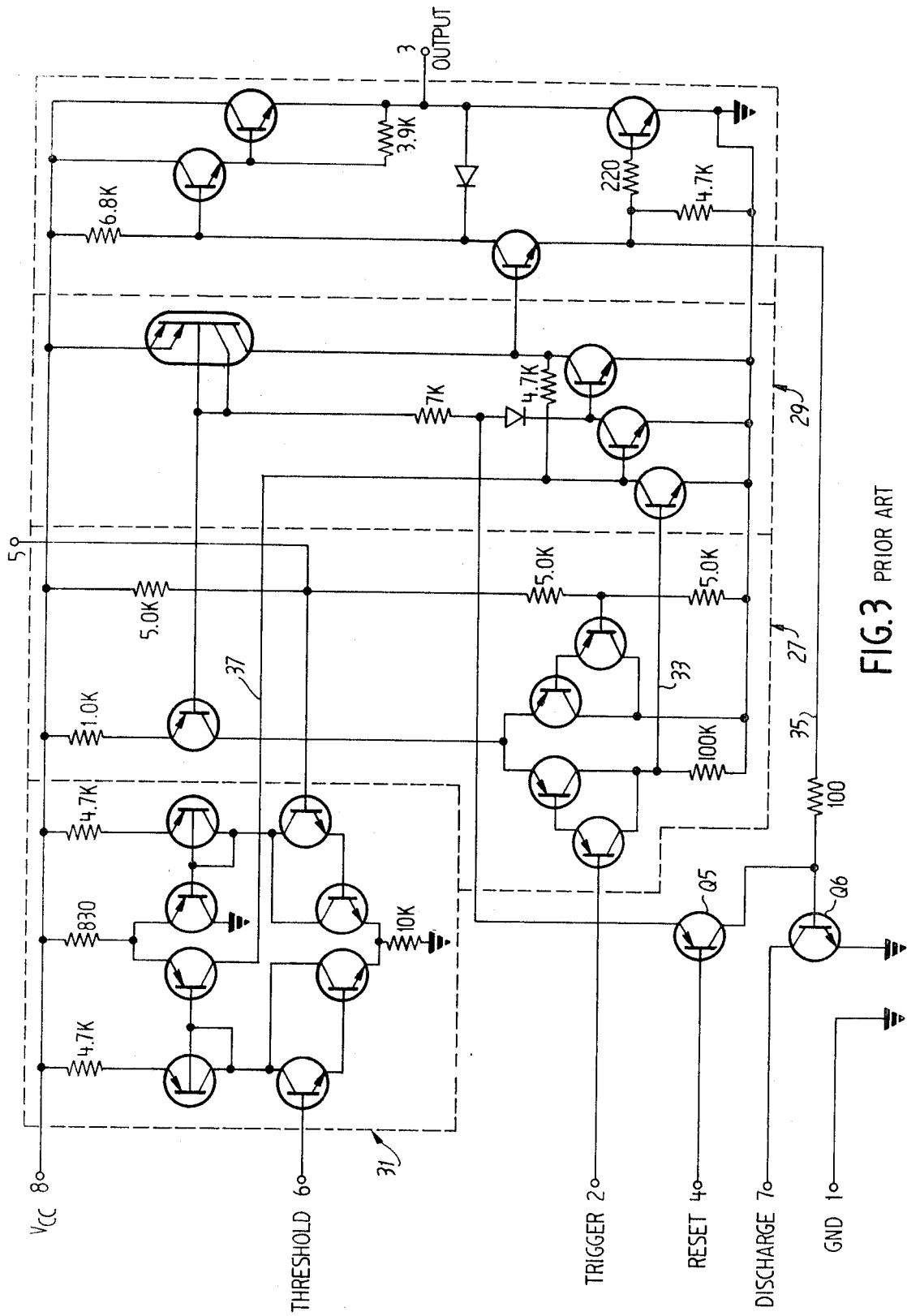
FIG. 3 is a schematic wire diagram of a monostable multivibrator circuit.

FIG. 1 illustrates a preferred embodiment of the invention adapted to control the ignition of a gas gas fired furnace such as the space heater of the type which is commonly used to heat trailers or mobile homes. The space heater includes an ignitor 10, a solenoid actuated main gas valve 12, and a fan driven by a fan motor 14.

The ignitor 10 is shown in FIG. 2 and comprises a ceramic body 16, a pair of Nichrome wires 18 extending axially through the ceramic body, and a platinum ignitor wire 20. At one end the Nichrome wires are spot welded to the ignitor wire 20 so as to form a series circuit through wires 18 and 20. At the opposite end, the Nichrome wires are provided with tabs to which electrical wiring connections may be made. A flange 22, formed integrally with the body 16, is provided for fastening the ignitor in proper position through a wall in the heater. Although the wire 20 is preferably made of platinum, other elements of the platinum group may be used.

The fan motor 14, (FIG. 2) is connected between the collector of a grounded emitter transistor Q4, and the positive side of the power supply "+ V." The base of Q4 is connected by lead 24 to one terminal of a set of switch contacts 26. The other terminal of contacts 26 is connected to the power supply. Switch contacts 26 are contacts associated with a thermostat such that when the ambient temperature drops below a desired temperature, as set on the thermostat, the contacts 26 close.

The power supply is connected through thermostat switch contacts 26 and a set of fan switch contacts 28 to a voltage regulator circuit including a resistor R1, a zener diode CR1, and a transistor Q1. The regulator output signal is limited to 14 volts D.C., this being the maximum operating voltage of the integrated circuits powered by the output signal from the emitter of Q1.

The emitter of Q1 is connector by lead 30 to pin 8 of an integrated circuit 32. The integrated circuit may be a commercially available monostable multivibrator circuit such as the model MC1455 sold by Motorolas Semiconductor Products, Inc., and schematically illustrated in FIG. 3.

Since the circuit of FIG. 3 is well known, it will not be described in detail. It includes a trigger comparator 27, a flip-flop 29, a threshold comparator 31, digital output circuits 33, a reset transistor Q5 and a discharge transistor Q6. Signals are applied to, or derived from, the circuit at a plurality of terminal connecting pins 1 through 8. Pin 8 is the power supply input and is connected to the emitter of Q1 (FIG. 1). Pins 6 and 7 are connected through a resistor R2 to the emitter of Q1, and are connected through a capacitor C1 to ground. Pin 1 is connected to ground and pin 5 is connected to ground through a capacitor C2. Pins 2 and 4 are connected by leads 34 and 36 to pin 8 and the emitter of Q1.

Briefly, the circuit of FIG. 3 operates as follows. With the trigger input pin 2 tied to the power supply input pin 8, application of power to the circuit causes the trigger comparator 27 to produce a signal on lead 33 to trigger flip-flop 29. The output of the flip-flop goes low thus driving the output pin 3 to a high level. The low level output of the flip-flop on lead 35 blocks the discharge transistor Q6 so that the capacitor C1 (FIG. 1) begins charging. When the voltage on the capacitor reaches about two-thirds of the power supply voltage at pin 8, the threshold comparator 31 produces an output signal on lead 38 to reset the flip-flop. When the flip-flop is reset, the output signal at pin 3 drops to a low level. At the same time, the output of the flip-flop conditions Q6 to discharge capacitor C1 to ground. The circuit is then ready for another cycle.

The output of the multivibrator 32 appearing at pin 3 is applied through a resistor R3 to the base of a transistor Q2. The base of Q2 is also connected to ground through a series circuit including a resistor R6 and zener diode CR2.

The transistor Q2 controls the heating of ignitor 10. The collector of Q2 is connected to +V and the emitter of Q2 is connected through the ignitor 10 and a resistor R7 to ground. Generally speaking, when the fan switch contacts close, the output of Q1 triggers the multivibrator circuit 32 to fire transistor Q2 for a short interval, T, of about two seconds. The exact interval T is determined by the equation $T = 1.1(R2)(C1)$. During this interval current flows through Q2 and the platinum wire of ignitor 10 to heat the wire.

The transistor Q2 in combination with CR2 functions as a voltage regulator and limits the current flowing through the ignitor 10 to some safe value. This regulating function is necessary because +V as applied to the collector of Q2, and the output signal of multivibrator 32, may both vary in magnitude depending upon the power supply from which +V is derived.

A second monostable multivibrator circuit 38 is provided for controlling the operation of the main gas valve solenoid 12. Multivibrator 28 may have the circuit configuration shown in FIG. 3 but the external connections to multivibrator 38 are somewhat different from the connections to multivibrator 32. The power supply input pin 8 of circuit 38 is connected to the emitter Q1 by leads 34 and 40. Pins 6 and 7 are connected through a resistor R4 to lead 40 and through a capacitor C3 to ground. Pin 5 is connected through a capacitor C4 to ground. Reset input pin 4 is connected to the emitter of Q1 by a lead 42, a resistor R11, and a lead 34. Pin 4 is also connected to ground through a circuit comprising a resistor R10 connected in parallel with a capacitor C5.

The trigger input pin 2 of circuit 38 is connected to the collector of a grounded emitter transistor Q5. The collector is also connected through a resistor R8 to +V. The base of Q5 is connected through a resistor R9 to ground, and through a capacitor C6 to a junction 44 between ignitor 10 and resistor R7. Because the trigger input pin 2 is not tied to the power supply input pin 8, as in multivibrator 32, the multivibrator 38 is not triggered upon application of a power supply to the multivibrator. Instead, it is triggered when the voltage of pin 2 drops to a value less than one-third the vaoltage applied to pin 8. Otherwise, the operation of multivibrator 38 is essentially the same as that described above for multivibrator 32.

The output pin 3 of multivibrator circuit 38 is connected through a resistor R5 to the base of a grounded emitter transistor Q3. The main gas valve solenoid 12 is connected in series with thermostat contacts 26 and fan contacts 28 between +V and the collector of Q3. A diode CR3 is connected in parallel with the main gas valve solenoid to suppress transient voltages. The contacts 46 of a flame actuated switch are connected between ground and the collector of Q3.

The operating sequence of the circuit shown in FIG. 1 is as follows. When the thermostat switch contacts 26 are closed, transistor Q4 is turned on to energize the fan motor 14. When the fan motor turns, it closes fan switch contacts 28 to apply power through the voltage regulator transistor Q1 to the power input pins 8 of both multivibrator circuits.

The output of Q1 immediately blocks the reset transistor Q5 (FIG. 3) of multivibrator 32 but, because of the delay introduced by R10, R11, and C5, the signal on lead 42 does not rise immediately. Thus, the reset input of multivibrator 38 is held low for a short interval of time sufficient for the voltage at pin 8 to reach operating level. The voltage on lead 42 then rises and blocks the reset transistor Q5 for multivibrator 38 so that the multivibrator may be triggered.

When the output of Q1 rises to a high level, the voltage on leads 36 causes the trigger comparator 27 of multivibrator 32 to trigger the flip-flop 29. The flip-flop produces a high level output signal at pin 3 of the multivibrator circuit to turn on Q2. This allows current flow through ignitor 10 to heat the ignitor wire. At the same time, the output of the flip-flop blocks discharge transistor Q6 so that capacitor C1 begins charging.

When transistor Q2 is turned on, the voltage level at junction 44 rises, thus producing a pulse through C6 to trigger Q5. When Q5 is triggered its collector voltage momentarily drops thus applying a triggering input to pin 2 of multivibrator circuit 38. This triggering input triggers comparator 27 in the multivibrator. The comparator triggers the flip-flop 31 and the output of the flip-flop turns off the capacitor discharge transistor Q6. With transistor Q6 off, capacitor C3 begins charging toward the output voltage of Q1. The flip-flop produces a high level output signal at pin 3 of the multivibrator circuit and this signal turns on transistor Q3. With Q3 on, a circuit is established from +V through thermostat contacts 26, fan contacts 28, the main gas valve solenoid 12, and Q3 to ground.

When the valve solenoid 12 is energized, it releases gas from a burner adjacent the heated platinum wire of ignitor 10. The gas is quickly ignited by the catalytic action of the heated platinum wire. Heat from the resulting flame closes flame actuated switch contacts 46 to provide a holding circuit for energizing the main gas valve solenoid 12.

The capacitor C1 continues charging for about two seconds after the multivibrator 32 is triggered. After two seconds, the voltage level on the capacitor is approximately two-thirds the output voltage of Q1, and this voltage level triggers the threshold comparator 37 (FIG. 3) to reset the flip-flop 31. When flip-flop 31 resets the signal at pin 3 drops to a low level thereby blocking transistor Q2 and terminating current flow through the ignitor 10. At the same time, the flip-flop produces a high level signal to condition the base of discharge transistor Q6. Transistor Q6 conducts thus forming a path to ground to discharge capacitor C1.

The capacitor C3 continues charging for about fifteen seconds after the multivibrator 38 is triggered. After fifteen seconds the voltage on the capacitor triggers the threshold comparator 37 and the threshold comparator resets the flip-flop 31 in the multivibrator 38. The high level output of the flip-flop conditions the base of the discharge transistor Q6 and the transistor conducts to discharge capacitor C3. The low level output of the flip-flop, appearing at pin 3, blocks Q3, If the ignitor has not ignited the gas within the fifteen second interval, the gas is cut off when Q3 is blocked by the output from multivibrator 38. On the other hand, if normal operation takes place, the gas will be ignited within the fifteen second interval and this will close the flame activated switch contacts 46. In this case the main gas valve solenoid 12 remains energized when Q3 is cut off because of the path to ground through contact 46.

The main gas valve solenoid remains energized until thermostat switch contacts 26 open, indicating that the space being heated has reached the desired temperature. The solenoid is connected in series with the fan switch contacts as a safety measure to shut off the gas supply to the main burner if the fan should not be operating. Otherwise, excessive heat from the burner might damage the heater.

In summary, the present invention provides a simple, compact, economical electrical ignitor and control system for igniting a gas fired heater without requiring a pilot flame. It includes all control necessary for starting and operating the heater, and includes safety features such as an interlock which prevents release of gas when the ignitor is not conditioned to ignite it. Because all electronic components are capable of being operated from a power supply voltage which varies of a wide range, the system is admirably suited for use with space heaters of the type found in camper trailers. However, it should be understood that while the control system disclosed herein is admirably suited for use in space heaters of the type found in camper trailers and automotive vehicles, its use is not so limited. It may be used equally well in gas fired furnaces of the type usually found in homes. While the invention has been described in connection with a gas fired hot air (space) heater, it may be used equally well in gas fired hot water heating systems. The only change required would be that the motor 14 drive a pump instead of a fan. Obviously, other modifications and substitutions may be made in the specific preferred embodiment described herein without departing from the spirit and scope of the invention as defined by the appended claims.

The embodiments of the invention in which an exclusive property or privilege are claimed are as follows:

1. In a gas fired heater system of the type including a burner and valve means for controlling the flow of fuel to said burner, the improvement comprising:
   catalytic ignitor means including an element positioned to contact fuel emerging from the burner;
   circuit means including timing means, responsive to a signal indicating that heating is desired, for causing current flow through said ignitor means for a predetermined interval of time shorter than the duration of said signal, the duration of said predetermined interval and the magnitude of said current flow being less than that required to bring said ignitor means to a heat where it will ignite said fuel by said heat alone; and,
   means for generating said signal indicating that heating is desired.

2. The improvement as claimed in claim 1 wherein said circuit means comprises a monostable multivibrator circuit means.

3. The improvement as claimed in claim 2 wherein said monostable multivibrator circuit means comprises a plurality of transistors, and said signal is applied as the power supply voltage for said multivibrator circuit means, said circuit means having no power supply voltage applied thereto in the absence of said signal.

4. The improvement as claimed in claim 1 and further comprising second circuit means responsive to current flow through said ignitor means for controlling said valve means whereby fuel may flow to said burner.

5. The improvement as claimed in claim 4 wherein said second circuit means comprises second monostable multivibrator circuit means, triggered as current begins to flow through said ignitor means, said second multivibrator circuit means producing a control signal for controlling said valve means for a predetermined interval less than the duration of the signal indicating heat is desired.

6. The improvement as claimed in claim 5 wherein said second monostable multivibrator circuit means includes timing constant means such that said second multivibrator circuit means produces said control signal for an interval greater than the interval current flows through said ignitor means.

7. The improvement as claimed in claim 5 wherein said second monostable multivibrator circuit means comprises a plurality of transistors and said signal is applied as the power voltage for said second multivibrator circuit means.

8. The improvement as claimed in claim 5 wherein the means for generating the signal indicating heating is desired includes:
   a power supply producing an output voltage within a range of values from a minimum voltage to a maximum voltage exceeding twice the magnitude of said minimum voltage;
   regulator means responsive to said power supply for producing an output voltage that is limited in magnitude, said output voltage being the signal indicating that heating is desired; and,
   thermostat switch contacts connected in series with said regulator means between said power supply and said first and second monostable multivibrator circuit means.

9. The improvement as claimed in claim 1 wherein the means for generating the signal indicating heating is desired includes:

a power supply producing an output voltage within a range of values from a minimum voltage to maximum voltage exceeding twice the magnitude of said minimum voltage;

regulator means responsive to said power supply for producing an output voltage that is limited in magnitude, said output voltage being the signal indicating that heating is desired; and, thermostat switch contacts connected in series with said regulator means between said power supply and said circuit means.

10. The improvement as claimed in claim 8 and further comprising;

a fan motor;

means responsive to closure of said thermostat switch contacts for energizing said fan motor; and, fan switch contacts, closed by operation of said fan motor, said fan switch contacts being connected in series with said regulator means between said thermostat switch contacts and said first and second monostable multivibrator circuit means.

11. The improvement as claimed in claim 5 and further comprising:

flame actuated switch contacts responsive to heat from fuel burning at said burner for completing a circuit to energize said valve means after the predetermined interval of said second monostable multivibrator circuit means has terminated.

12. The improvement as claimed in claim 11 and further including thermostat switch means connected in series with said valve means and said flame actuated switch means.

13. The improvement as claimed in claim 1 wherein said predetermined interval of time is about 2 seconds.

14. In a gas fired heater system of the type including a burner and an electrically actuated valve means for controlling the flow of fuel to said burner, the improvement comprising:

catalytic ignitor means including an ignitor element positioned to contact fuel emerging from the burner;

power supply means;

a first transistor switch connected in series with said ignitor element to said power supply means;

a second transisotr switch connected in series with said electrically actuated valve means to said power supply means;

first and second monostable multivibrators for controlling said first and second transistor switches, respectively;

means for triggering said first multivibrator in response to a signal indicating heat is desired, to thereby pulse said first intermediate switch; and, means responsive to current flow through said ignitor element for triggering said second multivibrator to thereby pulse said second transistor switch.

15. The improvement as claimed in claim 14 wherein said multivibrators comprise transistor circuits having no bias power supply normally connected thereto.

16. The improvement as claimed in claim 15 wherein said means for triggering said first multivibrator comprises means for connecting said power supply to both said multivibrators as the bias power supplies therefor.

* * * * *